United States Patent
Aurand et al.

(10) Patent No.: US 12,139,022 B2
(45) Date of Patent: Nov. 12, 2024

(54) MONITORING APPARATUS FOR AN ONBOARD ELECTRICAL SYSTEM OF AN AT LEAST PARTIALLY ELECTRICALLY OPERATED MOTOR VEHICLE, AND METHOD

(71) Applicant: Daimler Truck AG, Leinfelden-Echterdingen (DE)

(72) Inventors: Tobias Aurand, Freiberg (DE); Soeren Schoerle, Gerlingen (DE); Markus Zimmer, Leinfelden-Echterdingen (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 24 days.

(21) Appl. No.: 18/251,807

(22) PCT Filed: Nov. 2, 2021

(86) PCT No.: PCT/EP2021/080389
§ 371 (c)(1),
(2) Date: May 4, 2023

(87) PCT Pub. No.: WO2022/096459
PCT Pub. Date: May 12, 2022

(65) Prior Publication Data
US 2024/0042864 A1    Feb. 8, 2024

(30) Foreign Application Priority Data
Nov. 5, 2020   (DE) ..................... 10 2020 006 780.8

(51) Int. Cl.
*B60L 3/04*        (2006.01)
(52) U.S. Cl.
CPC ..................... *B60L 3/04* (2013.01)

(58) Field of Classification Search
CPC ........................................................ B60L 3/04
See application file for complete search history.

(56) References Cited

U.S. PATENT DOCUMENTS

2013/0307327 A1   11/2013   Auguet et al.

FOREIGN PATENT DOCUMENTS

DE    10 2009 036 672 A1    5/2010
DE    20 2014 003 287 U1    6/2015
(Continued)

OTHER PUBLICATIONS

PCT/EP2021/080389, International Search Report dated Feb. 18, 2022 (Two (2) pages).

(Continued)

*Primary Examiner* — Robert L Deberadinis
(74) *Attorney, Agent, or Firm* — Crowell & Moring LLP

(57) ABSTRACT

A monitoring apparatus of an onboard electrical system of an at least partially electrically operated motor vehicle. A switchgear is configured to switch a high-voltage positive path and a high-voltage negative path of an electrical energy storage device of the onboard electrical system. The switchgear has a control line which is coupled to a pyrotechnic safety device. In an event of an interruption of the control line, the switchgear opens the high-voltage positive path and the high-voltage negative path. A control line switchgear is series-coupled in the control line to the pyrotechnic safety device. The control line switchgear interrupts the control line as a function of a control signal of an electronic computing device. The electronic computing device is configured to check a voltage potential in the control line using the control line switchgear before the electrical energy storage device is connected to the onboard electrical system.

7 Claims, 1 Drawing Sheet

(56) References Cited

FOREIGN PATENT DOCUMENTS

DE    10 2016 011 335 A1    3/2017
EP         2 811 549 A1    12/2014

OTHER PUBLICATIONS

German Search Report issued in German application No. 10 2020 006 780.8 dated Jun. 10, 2021, with Statement of Relevancy (Eleven (11) pages).

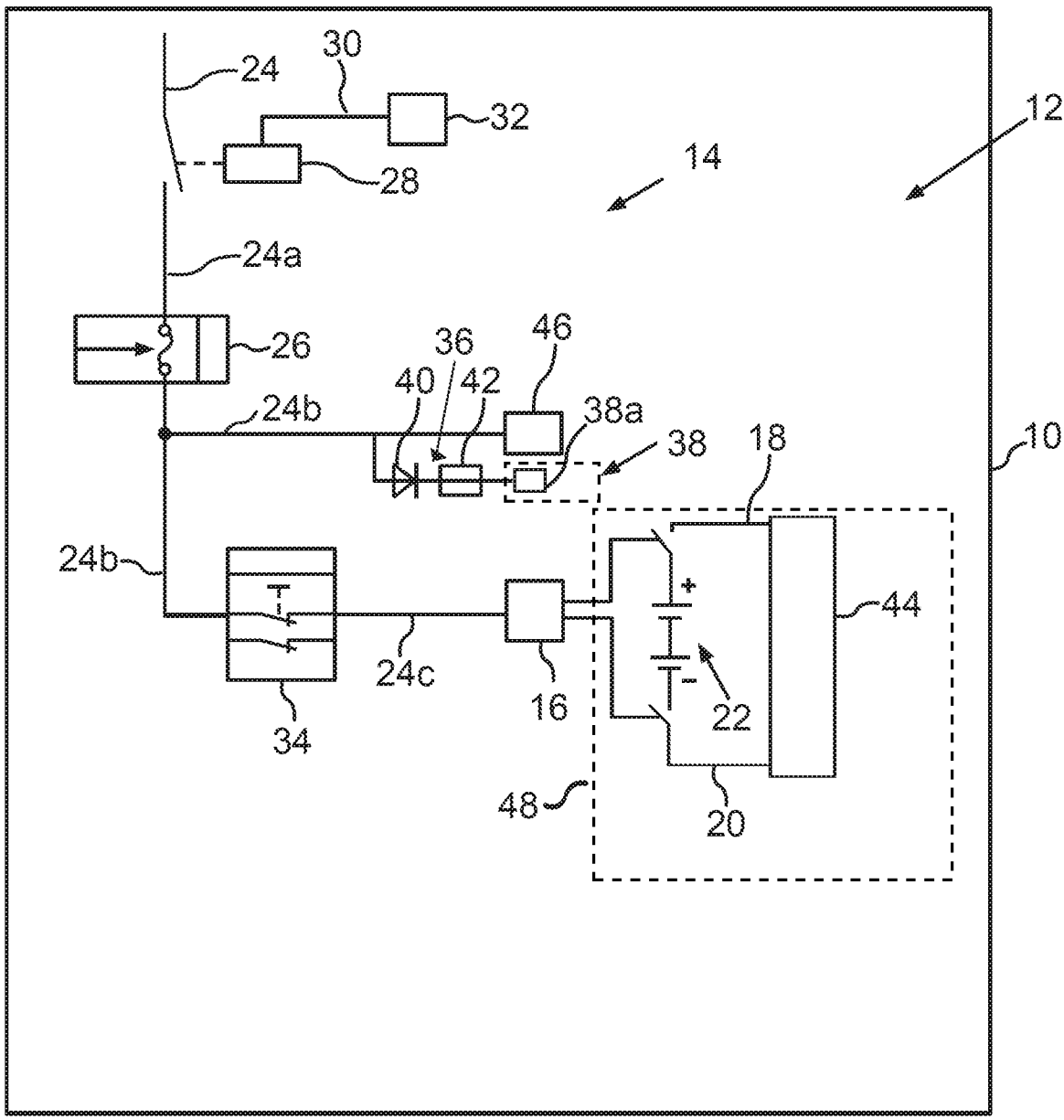

MONITORING APPARATUS FOR AN ONBOARD ELECTRICAL SYSTEM OF AN AT LEAST PARTIALLY ELECTRICALLY OPERATED MOTOR VEHICLE, AND METHOD

BACKGROUND AND SUMMARY OF THE INVENTION

The invention relates to a monitoring apparatus for an onboard electrical system of an at least partially electrically operated motor vehicle. The invention also relates to a method.

In a high-voltage onboard system of an at least partially electrically operated motor vehicle, which can also be referred to as a hybrid, in particular for a fully electrically operated motor vehicle, it is necessary to switch off the power supply safely and quickly in the event of an accident. For this purpose, feeding components, in particular an electrical energy storage device, especially a battery, have a special control line, also referred to as terminal 30C (KL30C). The main contactors of the electrical energy storage device are supplied with energy via this line, inter alia, so that a switching off, as occurs in servicing, or a disconnection of this line, which happens when a pyrofuse ignited by an airbag control unit is triggered, inevitably leads to the onboard electrical system, in particular the high-voltage components, being switched off. Other components, such as the drive inverters or any fuel cell that may be present, also have hardware and/or software provisions for initiating safety-related measures as soon as the voltage across the KL30C drops.

If a fault (e.g., frayed cables) now results in a connection with another parallel live line, safe disconnection in the event of a crash or servicing would no longer be guaranteed, as the line short circuit could still maintain the power supply to the contactors and the other safety reactions would also be suppressed.

Furthermore, it is currently customary to route all contactors in a system as well as safety lines of the other components via a single KL30C signal. However, this is particularly unfavorable in the case of servicing as it may be desirable to close contactors—especially those that cut off any subnetworks from the mains—without running the risk of unintentionally connecting sources, as this would mean, for example, that voltages above the safety threshold of 60 volts DC could occur in the system.

DE 10 2009 036 672 A1 discloses a procedure for switching off a high-voltage system in a motor vehicle. For this purpose, a switchgear having a first switch for disconnecting a first connection from a second connection and a second switch for disconnecting a third connection from a fourth connection is provided. In addition, the switchgear has an actuating element for triggering the first switch. A delay device is also provided to automatically trigger the second switch after a predetermined period of time following triggering of the first switch.

It is the object of the present invention to provide a monitoring apparatus and a method, by means of which an onboard electrical system for an at least partially electrically operated motor vehicle can be operated safely.

One aspect of the invention relates to a monitoring apparatus for an onboard electrical system of an at least partially electrically operated motor vehicle, having a switchgear which is designed to switch a high-voltage positive path and a high-voltage negative path of an electrical energy storage device of the onboard electrical system, wherein the switchgear has a control line which is coupled to a pyrotechnic safety device, wherein in the event of an interruption of the control line, the switchgear opens the high-voltage positive path and the high-voltage negative path. Such a switchgear can be, for example, the contactors of a high-voltage battery which can be opened via a control line of the so-called 30C terminal if necessary so that the high-voltage battery is disconnected from the onboard network and the system.

It is provided that a control line switchgear is series-coupled in the control line to the pyrotechnic safety device, wherein the control line switchgear can interrupt the control line as a function of a control signal of an electronic computing device of the monitoring apparatus.

It is thus provided in particular that a so-called relay is series-connected to the pyrotechnic safety device as a control line switchgear. In particular, the safety line is also referred to as the KL30C line. This relay is controlled by the control unit, i.e., the electronic computing device. This also makes it possible to check the potential within the KL30C line, for example, before the voltage is connected, i.e., in particular within the context of a so-called start-up sequence of the onboard electrical system. If a voltage is already present across the KL30C line with an open relay, this can be detected by the components connected to the KL30C line. Since all components or control units are connected via a corresponding BUS component, in particular via a CAN BUS component, the result of this check can be transmitted to the central control unit and compared there with the setpoint value. If the result is incorrect, the energy storage device is prevented from being connected to the onboard electrical system. If there is no voltage on the line when the relay is open, the relay is closed and the consumer is supplied with an appropriate voltage on the control line and a positive test is carried out. If the desired voltage is then present at the KL30C inputs of all of the components concerned, the system is working and the electrical energy storage device can be started up safely.

In other words, it is proposed to additionally series-connect the control line switchgear to the pyrotechnic safety device, which can also be referred to as a pyrofuse, at the 30C terminal for the safety disconnection of the voltage connection in order to even better guarantee and expand safety conditions here. Advantageously, the control line switchgear can be arranged in series upstream of the pyrotechnic safety device so that this area of the control line can also be checked. The relay that is series-connected upstream as a control line switchgear can thus also enable a disconnection in the case of a fault in the area of the control line up the pyrofuse. In addition, the relay can still be used to disconnect the voltage in the control line during a crash without an airbag being deployed, in the case of which the pyrofuse normally disconnects the control line.

In addition, other states of the motor vehicle are conceivable in which it makes sense to reversibly disconnect the control line and to thus switch off the high-voltage components, this being made possible by the present invention without having to resort to an irreversible disconnection by the pyrofuse due to safety concerns.

In particular, it is proposed that the relay is series-connected to the pyrofuse, this thus serving as a further safety trigger in the case of a fault in the pyrofuse itself, and/or can be controlled separately in order to disconnect the voltage in the control line and thus also to switch off the voltage supply to the high-voltage components by means of the downstream switchgear.

According to one advantageous embodiment, the electronic computing device is designed to check a voltage potential in the control line using the control line switchgear before the electrical energy storage device is connected to the onboard electrical system.

It is furthermore advantageous if an actual voltage evaluated by means of the electronic computing device is compared within the control line with a target voltage when the further switchgear is open, and the control signal is generated on the basis of the comparison.

It has further proven to be advantageous if the control line has a service interface, wherein the service interface is designed to interrupt the control line as a function of an actuation. This is often also referred to as "service disconnect" since the voltage supply to the high-voltage components can be safely switched off by disconnecting the control line via manually actuating the service interface, in particular when working on the motor vehicle in a workshop, thus making it possible to work on the motor vehicle safely.

In another advantageous embodiment, the monitoring apparatus has a further safety device within the control line, wherein the further safety device is coupled to at least one electric power take-off.

The further safety device advantageously has a diode which serves to prevent power from being fed back from the electric power take-off back into the control line. This is to prevent voltage from being fed back to the control line from the electric power take-off and the control line then not being able to function properly.

Also advantageously, the further safety device can have a fuse for providing the control line with short-circuit protection. In this way it can be prevented that the entire onboard electrical system has to be unavoidably switched off by a short circuit in the electric power take-off.

Another aspect of the invention relates to an onboard electrical system having a monitoring apparatus according to the preceding aspect. Furthermore, yet another aspect of the invention relates to a motor vehicle having an onboard electrical system.

Yet another aspect of the invention relates to a method for operating a monitoring apparatus for an onboard electrical system of an at least partially electrically operated motor vehicle, in which a high-voltage positive path and a high-voltage negative path of an electrical energy storage device of the onboard electrical system are switched by means of a switchgear, wherein the switchgear has a control line which is coupled to a pyrotechnic safety device, wherein in the event of an interruption of the control line, the switchgear is opened and the high-voltage positive path and the high-voltage negative path are opened.

It is provided that a control line switchgear is series-coupled in the control line to the pyrotechnic safety device, wherein the control line switchgear interrupts the control line as a function of a control signal of an electronic computing device of the monitoring apparatus.

Advantageous embodiments of the monitoring apparatus are to be regarded as advantageous embodiments of the onboard electrical system, of the motor vehicle and of the method. The monitoring apparatus, the onboard electrical system and the motor vehicle have subject-matter features which enable the method or an advantageous embodiment thereof to be carried out.

Further advantages, features and details of the invention arise from the following description of a preferred exemplary embodiment and on the basis of the drawing. The features and feature combinations mentioned above in the description and the features and feature combinations mentioned below in the description of the FIGURE and/or shown alone in the single FIGURE can be used not only in the respectively given combination but also in other combinations or in isolation, without departing from the scope of the invention.

BRIEF DESCRIPTION OF THE DRAWING

The single FIGURE shows a schematic block diagram of an embodiment of a motor vehicle with an embodiment of an onboard electrical system with an embodiment of a monitoring apparatus.

DETAILED DESCRIPTION OF THE DRAWING

In the FIGURE, identical or functionally identical elements are provided with the same reference signs.

The single FIGURE shows a schematic block diagram of an embodiment of a motor vehicle 10. In the present case, the motor vehicle 10 is shown purely schematically. The motor vehicle 10 is operated at least partially electrically. In particular, the motor vehicle 10 is operated entirely electrically. The motor vehicle 10 has an onboard electrical system 12. In particular, the onboard electrical system 12 has a monitoring apparatus 14. The monitoring apparatus 14 has a switchgear 16 which is designed to switch a high-voltage positive path 18 and a high-voltage negative path 20 of an electrical energy storage device 22 of the onboard electrical system 12, the switchgear 16 having a control line 24, 24a, 24b, 24c which is coupled to a pyrotechnic safety device 26, wherein in the event of an interruption of the control line 24, 24a, 24b, 24c, the switchgear 16 opens the high-voltage positive path 18 and a high-voltage negative path 20.

The control line 24, 24a, 24b, 24c can in particular also be referred to as a KL30C line, whereby for a better description of the control line 24, the different areas of the control line 24a, 24b, 24c are provided with their own reference signs but always refer to the same control line, so that in the following the reference sign of the control line 24 refers to the whole control line 24, 24a, 24b, 24c.

It is provided that a control line switchgear 28 is series-coupled in the control line 24 to the pyrotechnic safety device 26, whereby the control line switchgear 28 can interrupt the control line 24 as a function of a control signal 30 from an electronic computing device 32 of the monitoring device 14. The control line switchgear 28 is designed in particular as a relay. If the control line 24 is interrupted by the control line switchgear 28, the voltage supply to the areas of the control line 24a, 24b, 24c downstream of the control line switchgear 28 is switched off without a fault.

In the following, the control line 24 is always described in relation to the control via a voltage or via the absence of voltage. However, in the case of closed connections, currents obviously also flow which should not go unmentioned or ignored and which can also be large depending on the switchgear 16, 38a, 46 to be switched. In accordance with the switchgear to be controlled and switched and which are connected to the control line 24, the current must obviously also have a minimum strength in this case, but this is clearly evident and known to a person skilled in the art in relation to the control. Therefore, this aspect will not be discussed in detail below and the appropriate sizes and dimensions will depend on the design of the system.

Here as well, the absence of voltage in the control line means that the voltage in the control line has dropped in such a way that switching or closing the switchgear 16, 38a, 46 is not possible and thus does not exceed the voltage threshold needed for switching.

The pyrotechnic safety device 26 can be triggered, for example, by an airbag control unit (not shown) or other control units in order to enable the onboard system 12 or at least parts of the onboard system 12 to be switched off quickly and reliably in the case of damage or a fault. Such a pyrotechnic safety device 26 is also referred to as a pyrofuse and represents an irreversible disconnection of the control line 24.

The control line switchgear 28 is designed as a reversible switchgear so that as a result the control line 24 can be electrically connected and disconnected time and again. For this purpose, the control line switchgear 28 is arranged in series upstream of the pyrotechnic safety device 26 so that the voltage supply to the area of the control line 24a between the control line switchgear 28 and the pyrotechnic safety device 26 can be switched off by the control line switchgear 28 and not by the pyrotechnic safety device 26. In this case, checking of the area of the control line 24a by the monitoring apparatus 14 is thus also possible.

The voltage supply to the area of the control line 24b downstream of the pyrotechnic safety device 26 can then be switched off reversibly by the control line switchgear 28 and irreversibly by the pyrotechnic safety device 26. It can be provided in particular that the electronic computing device 32 is designed to check a voltage potential in the control line 24 on the basis of the control line switchgear 28 before the electrical energy storage device 22 is connected to the onboard electrical system 12. It can accordingly be provided that an actual voltage evaluated by means of the electronic computing device 32 is compared within the control line 24 with a target voltage when the control line switchgear 28 is open and the control signal 30 is generated as a function of the comparison or to prevent the electrical energy storage device 22 from being connected.

The FIGURE further shows that the control line 24 has a service interface 34 which is also referred to as service disconnect, wherein the service interface 34 is designed to interrupt the control line 24 as a function of an actuation. It is thus possible in particular to disconnect the control line 24 by manually actuating the service interface 34, in particular when working on the motor vehicle 10 in a workshop, so that the voltage supply to the high-voltage components 48 can be safely switched off and it is thus possible to work on the motor vehicle 10 safely.

By actuating the service interface 34, the control line 24 is disconnected in such a way that no voltage is supplied to the area of the control line 24c and thus the switchgear 16 opens the high-voltage positive path 18 and the high-voltage negative path 20. Thus, when the service interface 34 is actuated, no voltage is supplied to the area of the control line 24c and the contactors of the electrical energy storage device 22 are thereby opened, which also switches off the voltage supply to the high-voltage components 48. Other switchgears that are connected to and controlled by the area of the control line 24c are opened when the service interface 34 is actuated and the areas and/or components connected thereby are disconnected. Other components of the onboard electrical system 12, in particular sub-networks or charging sockets, which are connected to the area of the control line 24b and the switchgear and/or contactors of which are controlled by the area of the control line 24b, are not affected by the switching off by the service interface 34.

In the embodiment illustrated here, the service interface 34 is arranged in series in the area of the control line 24b downstream of the pyrotechnic safety device 26 in such a way that the area of the control line 24b is not influenced by the service interface 34 and only the voltage supply to the area of the control line 24c can be switched off by it. Together with the area of the control line 24b, the voltage supply to the area of the control line 24c is correspondingly reversibly switched off by the control line switchgear 28 and irreversibly by the pyrotechnic safety device 26.

In alternative embodiments, in the absence of voltage or when the voltage in the control line 24 or in the areas of the control line 24a, 24b, 24c is reduced, the switchgear connected thereto can also close instead of open, which depends on the function and application of the area of the onboard electrical system 12 that is switched by the switchgear or the corresponding components.

The FIGURE furthermore shows that the monitoring apparatus 14 can have a further safety device 36 within the area of the control line 24b, wherein the further safety device 36 is coupled to at least one electric power take-off 38 (ePTO). By the electric power take-off is meant other consumers which do not necessarily have to be part of the actual onboard electrical system 12 of the motor vehicle 10 and can only be connected thereto.

Due to the connection to the power supply of the motor vehicle 10 with for the most part the function of a drive of an additional component, the term electric power take-off (ePTO) has also been created analogously to the mechanical output of a drive train of motor vehicles.

Nevertheless, coupling the area of the control line 24b, or to be more precise the further safety device 36, with a power take-off switchgear 38a of the electric power take-off 38 also enables control and corresponding connection and disconnection of the electric power take-off 38 from the rest of the onboard system via the power take-off switchgear 38a and thus by the control line 24.

Other electrical consumers can be connected to such an electric power take-off, for example superstructures of motor vehicles such as a cooing structure, a crane, a waste compactor, a hydraulic pump, etc.

In the present exemplary embodiment, the safety device 36 comprises a diode 40 and a fuse 42, which is intended to both limit the current flow in the control line 24b and to prevent a return flow of energy. In particular, the diode 40 can be designed as an alternative or in addition to the fuse 42.

In order to prevent possible faults in the vehicle structure manufactured elsewhere, in particular in the electric power take-off 38, or to prevent unwanted feedback or feeds into the KL30C vehicle system in the case of a fault and thus to be able to at least maintain the driving operation, the additional diode 40 and/or the fuse 42 can be provided in this branch of the KL30C network. The diode serves here as a backfeed protection and the additional fuse 42 serves as short-circuit protection and, as mentioned above, prevents a short circuit from inevitably switching off or from being able to switch off the voltage supply to the entire onboard electrical system 12.

Furthermore it is shown that the electrical energy storage device 22 with the high-voltage positive path 18 and the high-voltage negative path 20 can be coupled to further consumers 44 of the motor vehicle 10. The further consumers 44 are only shown schematically. These consumers 44 on the high-voltage paths 18, 20 can also be referred to in general as high-voltage components 48 and, for example, in addition to the battery as the electrical energy storage device 22, also comprise a high-voltage inverter or DC/AC converter, a DC/DC converter, a high-voltage charging system, a high-voltage auxiliary heater or other components which are supplied by the high voltage of the onboard system 12 or are connected thereto.

It is therefore proposed that the control line switchgear 28 which can also be referred to as a relay—with this relay in particular being able be referred to as KL30C relay—is added to the control line 24, whereby the relay can be controlled by the electronic computing device 32 which can also be designed as a central computing device. This enables the potential of the KL30C line to be checked before the voltage is connected, i.e., in particular in the context of the "start-up sequence" of the electrical energy storage device 22. If a voltage is already present across the KL30C line, to be more precise across the areas of the control line 24a, 24b, 24c when the relay is open, it can be detected by the components which are connected to the KL30C line. Since all components or control units are connected via a CAN BUS, the result of this check can be transmitted to the electronic computing device 32 and compared there with the setpoint value. If the result is incorrect, that indicates a fault in the control line 24, in particular in the areas of the control line 24a, 24b, 24c, and prevents connection of the electrical energy storage device 22. If there is no voltage on the control line 24 when the relay is open, the relay is closed and a positive test is performed. If the desired voltage is then present on the KL30C inputs of all affected components, then the onboard electrical system 12 is working and the electrical energy storage device 22 can be started up safely. The control via the control line 24 correspondingly prevents the switchgears, in particular the switchgear 16, from then being closed, meaning that the consumer 44 can be correspondingly supplied with energy from the electrical energy storage device 22.

Furthermore, the control line switchgear 28 can also be used to reversibly switch off the onboard electrical system 12 in the case of a slight crash in which the pyrotechnic safety device 26 is not triggered via an airbag control unit. A corresponding signal can be used for this. Furthermore, it is also possible to open the KL30C relay shortly before a crash occurs, i.e., in particular before a cold deformation of the motor vehicle 10, if a crash is detected as being unavoidable (for example via assistance systems which generate the corresponding pre-crash detection signals), and therefore to induce the safe system state even earlier than is known from the prior art.

In order to be able to above-described problems of interconnecting subnetworks but at the same time to ensure maximum safety by maintaining the disconnection of sources, a branch is also provided in the control line 24 between the pyrotechnic safety device 26 and the service interface 34, i.e., in the area of the control line 24b, to which components, in particular the contactors thereof, can be connected, which do not represent or have any energy sources, such as charging sockets for example. In the case of a service, in which the service disconnect assumes the function of a connection lock, this allows certain contactors, for example charging contactors, to be actuated for the purpose of system diagnostics despite the onboard electrical system 12 or the high-voltage components 48 being switched off, while all other components connected to KL30C in the area of the control line 24c remain safely switched off when the service disconnect is electrically open. Furthermore, by monitoring the voltages of the control line 24, above all by comparing the voltages between the areas of the control line 24b and 24c, when the ignition is switched on it can be immediately detected whether the service disconnect is still actuated and, if necessary, a warning message can be displayed on a display device in the motor vehicle 10.

Overall, the invention shows the generation of a monitoring of the safety line.

LIST OF REFERENCE CHARACTERS 10 motor vehicle
12 onboard electrical system
14 monitoring apparatus
16 switchgear
18 high-voltage positive path
20 high-voltage negative path
22 electric energy storage device
24 control line
24a area of the control line
24b area of the control line
24c area of the control line
26 pyrotechnic safety device
28 control line switchgear
30 control signal
32 electronic computing device
34 service interface
36 further safety device
38 electric power take-off
38a power take-off switchgear
40 diode
42 fuse
44 consumer
46 further switchgear
48 high-voltage components

The invention claimed is:

1. A monitoring apparatus (14) of an onboard electrical system (12) of an at least partially electrically operated motor vehicle (10), comprising:
   a switchgear (16) which is configured to switch a high-voltage positive path (18) and a high-voltage negative path (20) of an electrical energy storage device (22) of the onboard electrical system (12);
   wherein the switchgear (16) has a control line (24, 24a, 24b, 24c) which is coupled to a pyrotechnic safety device (26);
   wherein in an event of an interruption of the control line (24, 24a, 24b, 24c), the switchgear (16) opens the high-voltage positive path (18) and the high-voltage negative path (20);
   a control line switchgear (28) series-coupled in the control line (24) to the pyrotechnic safety device (26); and
   an electronic computing device (32), wherein the control line switchgear (28) interrupts the control line (24, 24a, 24b, 24c) as a function of a control signal (30) of the electronic computing device (32);
   wherein the electronic computing device (32) is configured to check a voltage potential in the control line (24, 24a, 24b, 24c) using the control line switchgear (28) before the electrical energy storage device (22) is connected to the onboard electrical system (12).

2. The monitoring apparatus (14) according to claim 1, wherein an actual voltage evaluated by the electronic computing device (32) is compared within the control line (24, 24a, 24b, 24c) with a target voltage when the control line switchgear (28) is open and wherein the control signal (30) is generated on a basis of the comparison.

3. The monitoring apparatus (14) according to claim 1, wherein the control line (24, 24a, 24b, 24c) has a service interface (34) and wherein the service interface (34) is configured to interrupt the control line (24, 24*a*, 24*b*, 24*c*) as a function of an actuation.

4. The monitoring apparatus (14) according to claim 1, further comprising a further safety device (36) within the control line (24*b*), wherein the further safety device (36) is coupled to an electric power take-off (38).

5. The monitoring apparatus (14) according to claim 4, wherein the further safety device (36) has a diode (40) which prevents power from being fed back from the electric power take-off (38) back into the control line (24*b*).

6. The monitoring apparatus (14) according to claim 4, wherein the further safety device (36) has a fuse (42) that protects the control line (24*b*).

7. A method for operating the monitoring apparatus (14) according to claim 1, comprising the step of:
    checking a voltage potential in the control line (24, 24*a*, 24*b*, 24*c*) by the electronic computing device (32) using the control line switchgear (28) before the electrical energy storage device (22) is connected to the onboard electrical system (12).

\* \* \* \* \*